W. E. DAMANT.
Improvement in Dough-Mixers.

No. 128,288. Patented June 25, 1872.

Witnesses:
Chas. Nida.
Alex F. Roberts

Inventor:
W. E. Damant
Munn &
PER
Attorneys.

128,288

UNITED STATES PATENT OFFICE.

WILLIAM EDWARD DAMANT, OF WEST HOBOKEN, NEW JERSEY.

IMPROVEMENT IN DOUGH-MIXERS.

Specification forming part of Letters Patent No. 128,288, dated June 25, 1872.

Specification describing a new and Improved Dough and Paste Mixer, invented by WILLIAM E. DAMANT, of West Hoboken, in the county of Hudson and State of New Jersey.

Figure 1:
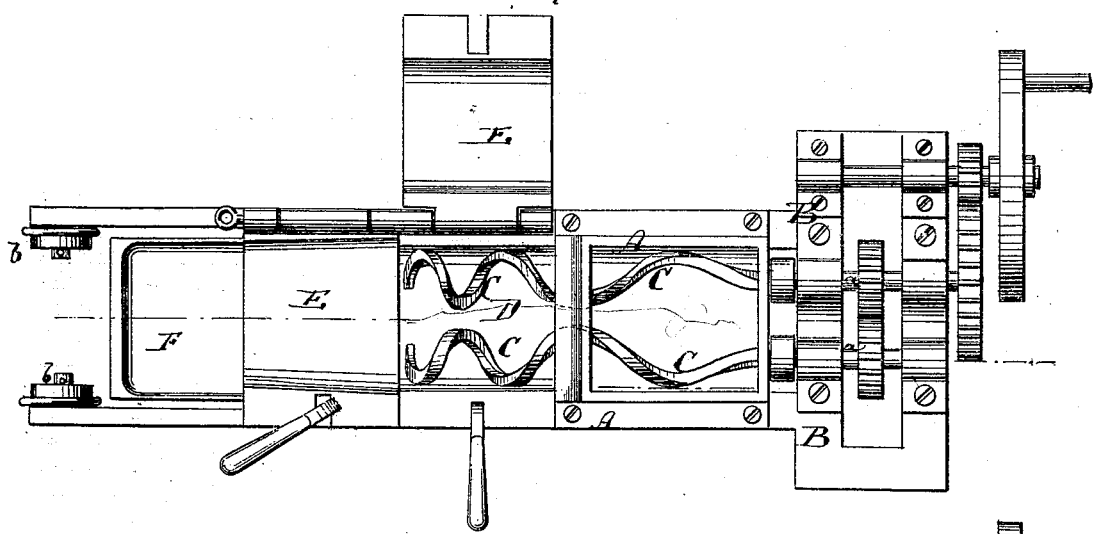
Figure 2:
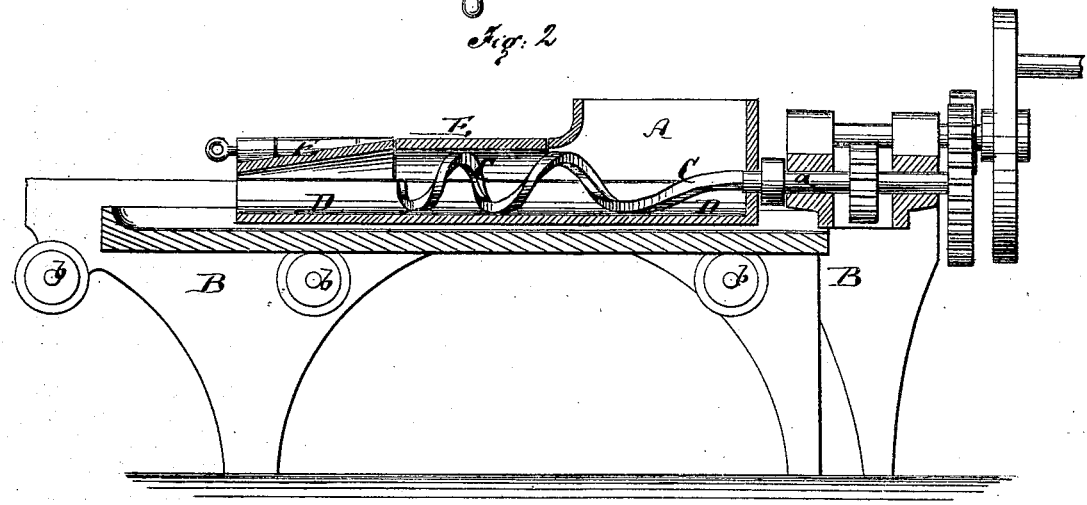
Figure 3:
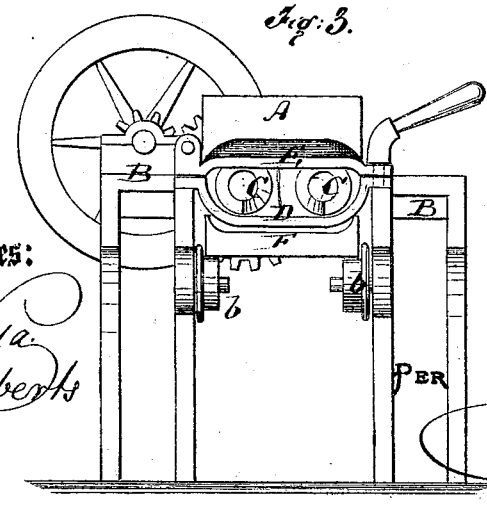

In the accompanying drawing, Figure 1 is a top view; Fig. 2, a vertical longitudinal central section; and Fig. 3, an end view of my improved dough and paste mixer.

Similar letters of reference indicate corresponding parts.

This invention relates to a new machine for properly mixing, agitating, and shaking dough and paste for bakers or confectioners. This invention consists, first, in the use for the mixing purpose of two screws, revolving in opposite directions, and twisted in reverse order, so that they will not only agitate, but feed the matter to be acted upon. The invention also consists in the use of a sliding platform, upon which the dough is discharged by the screws, and which is so lightly supported on rollers that it will be moved ahead by the dough emerging from the machine.

A in the drawing represents the feed hopper or box of the apparatus, supported on a suitable table, B. C C are two screw-stirrers, attached to arbors $a\ a$, which extend through one end of the box A, and are geared together to revolve in opposite directions whenever turned by suitable mechanism. The screws C C are twisted in opposite directions, and will, consequently, in revolving, alternately approach each other, and spread apart at every section of their length. This will cause them to feed the dough from the hopper, and gradually crowd it forward in the direction of their lengths, and to crush and stir it while so feeding. Heretofore, when, in a dough-mixer or similar apparatus, but one screw was employed, it was necessary to feed and crowd the matter by special means, as the single screw is not able to draw the matter from the box A. The screws C C extend within the mixing vessel or trough D, which is closed on top by a lid or lids, E, hinged and closed down during operation. The end lid can be made removable, as it aids in shaping the mouth of the vessel D, and therefore also the cross-section of the stream of dough emerging therefrom. The dough discharged by the screws C from the vessel D is deposited upon a plate or trough, F, which rests on rollers $b\ b$ so lightly that the forward motion of the dough will suffice to move it ahead on the rollers, and to therefore receive the dough in a uniform layer of the desired form. When the plate F is filled it can be removed, with its contents, and conveyed to the oven, cutting apparatus, or other place, and an empty plate substituted for it on the machine. If the plate F were not so movable on the machine the dough would be deposited on it from the mixing apparatus in an unshapely mass.

Having thus described my invention, I claim as new and desire to secure by Letters Patent—

1. The two screws C C, reversely twisted, and revolved in opposite directions, in combination with a trough-vessel D having hopper A, arranged as and for the purpose set forth.

2. The combination, with reversely twisted and revolved screws C and vessel D A, of the trough F, resting lightly on rollers $b\ b$, as and for the purpose described.

WILLIAM EDWARD DAMANT.

Witnesses:
A. V. BRIESEN,
T. B. MOSHER.